United States Patent
Kim

(10) Patent No.: US 7,433,684 B2
(45) Date of Patent: Oct. 7, 2008

(54) APPARATUS AND METHOD FOR VERIFYING DIVERSITY OF A BASE STATION IN A MOBILE COMMUNICATION SYSTEM

(75) Inventor: Jae-Hyoung Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 76 days.

(21) Appl. No.: 10/885,986

(22) Filed: Jul. 7, 2004

(65) Prior Publication Data
US 2005/0009513 A1    Jan. 13, 2005

(30) Foreign Application Priority Data
Jul. 7, 2003    (KR) ...................... 10-2003-0045641

(51) Int. Cl.
*H04B 1/02*    (2006.01)
*H04Q 7/20*    (2006.01)
(52) U.S. Cl. ............................ 455/423; 455/9; 455/101; 455/562.1; 370/334; 370/335
(58) Field of Classification Search ................. 455/424, 455/425, 423, 13.3, 9, 101, 562.1; 370/334, 370/335, 342
See application file for complete search history.

(56) References Cited

U.S. PATENT DOCUMENTS

| | | | |
|---|---|---|---|
| 6,073,026 A | | 6/2000 | Kim et al. |
| 6,128,474 A | * | 10/2000 | Kim et al. ................ 455/67.11 |
| 6,894,657 B2 | * | 5/2005 | Carey .......................... 343/853 |
| 2002/0072392 A1 | * | 6/2002 | Awater et al. ............... 455/561 |
| 2004/0066708 A1 | * | 4/2004 | Ogawa ........................ 367/138 |
| 2004/0066866 A1 | * | 4/2004 | Tong et al. ................... 375/347 |
| 2005/0117520 A1 | * | 6/2005 | Miyoshi ...................... 370/238 |
| 2005/0129068 A1 | * | 6/2005 | Ginzburg et al. ........... 370/478 |

FOREIGN PATENT DOCUMENTS

| | | |
|---|---|---|
| EP | 0 741 465 | 11/1996 |
| EP | 741465 A2 * | 11/1996 |
| EP | 1 237 310 | 9/2002 |
| GB | 2 272 604 | 5/1994 |

* cited by examiner

*Primary Examiner*—George Eng
*Assistant Examiner*—Brandon J Miller
(74) *Attorney, Agent, or Firm*—The Farrell Law Firm, PC

(57) ABSTRACT

An apparatus for verifying diversity of a base station in a mobile communication system in which the base station outputs at least one antenna signal using a space-time transmit diversity. Attenuators attenuate and output each antenna signal according to reception sensitivity of a terminal. A coupler couples the signals output from the attenuators with each other and outputs a coupled signal. The terminal receives the coupled signal and demodulates the received signal. A computer is connected to the terminal, and monitors an operation state of the terminal while receiving the signal from the base station, and performs an error check for determining if an error exists in the signal received in the terminal.

8 Claims, 4 Drawing Sheets

| FREQUENCY BAND (MHz) | QPSK | | 16QAM | | 64QAM | |
|---|---|---|---|---|---|---|
| | 1/2 | 3/4 | 1/2 | 3/4 | 2/3 | 3/4 |
| 1.5 | −91 | −89 | −84 | −82 | −78 | −76 |
| 1.75 | −90 | −87 | −83 | −81 | −77 | −75 |
| 3 | −88 | −86 | −81 | −79 | −75 | −73 |
| 3.5 | −87 | −85 | −80 | −78 | −74 | −72 |
| 5 | −86 | −84 | −79 | −77 | −72 | −71 |
| 6 | −85 | −83 | −78 | −76 | −72 | −70 |
| 7 | −84 | −82 | −77 | −75 | −71 | −69 |
| 10 | −83 | −81 | −76 | −74 | −69 | −68 |
| 12 | −82 | −80 | −75 | −73 | −69 | −67 |
| 14 | −81 | −79 | −74 | −72 | −68 | −66 |
| 20 | −80 | −78 | −73 | −71 | −66 | −65 |

FIG.3

| FIRST ATTENUATION | SECOND ATTENUATION | EXISTENCE OR ABSENCE OF SPACE-TIME CODING SETTING IN TERMINAL | ERROR STATE |
|---|---|---|---|
| -20dB | -20dB | YES | GOOD |
| -20dB | -40dB | YES | GOOD |
| -40dB | -20dB | YES | GOOD |
| -20dB | -20dB | NO | BAD |
| -20dB | -40dB | NO | GOOD |
| -40dB | -20dB | NO | BAD |

FIG. 4

APPARATUS AND METHOD FOR VERIFYING DIVERSITY OF A BASE STATION IN A MOBILE COMMUNICATION SYSTEM

PRIORITY

This application claims priority to an application entitled "Apparatus and Method for Verifying Diversity of Base Station in Mobile Communication System" filed in the Korean Intellectual Property Office on Jul. 7, 2003 and assigned Ser. No. 2003-45641, the contents of which are hereby incorporated by reference.

BACKGROUND OF THE INVENTION

1. Field of the Invention

The present invention relates generally to a mobile communication system, and more particularly to an apparatus and a method for verifying diversity of a base station supporting an orthogonal frequency division multiplexing (OFDM) method.

2. Description of the Related Art

Generally, a base station is an important factor when a mobile communication system is designed. A base station transmits/receives radio waves from/to a mobile communication terminal wirelessly in a mobile communication system, and exchanges data and voice signal with the mobile terminal. A base station transmits modulated data and voice signals together with a carrier signal, carrying the data and voice signals to a mobile communication terminal through the air.

Recently, it has been anticipated that an OFDM-based modulation technology, $4^{th}$ generation modulation technology, is to be used as a digital TV standard in Japan and Australia. Accordingly, base stations supporting an OFDM method are increasing in use.

An OFDM method is a kind of multi-carrier modulation method and shows excellent performance in multi-path and mobile reception environments. Base stations supporting the OFDM method as described above use a space-time coding (STC) to obtain antenna transmission diversity. However, until recently, there are no measurement reference and measurement environments for verifying the space-time coding used in the base stations. Therefore, it is difficult to verify the space-time coding used in the base station before actually operating the base station.

Further, because it is difficult to move and change a base station after the base station is installed, functions of the base station must be clearly verified at a development step.

SUMMARY OF THE INVENTION

Accordingly, the present invention has been designed to solve the above —and other problems occurring in the prior art, and an object of the present invention is to provide an apparatus and a method for verifying diversity performance of a base station, which can verify in advance a space-time coding used in the base station.

Another object of the present invention is to provide an apparatus and a method for verifying diversity of a base station, which can verify in advance a space-time coding used in the base station, using an OFDM method, thereby reducing cost and time necessary for installing the base station.

In order to accomplish the above and other objects, according to an aspect of the present, there is provided an apparatus including a base station for outputting at least one antenna signal by means of a space-time transmit diversity, attenuators for attenuating and outputting each of the at least one antenna signal according to reception sensitivity of a terminal, a coupler for coupling the signal output from the attenuators with each other and outputting a coupled signal, the terminal for receiving the coupled signal and demodulating the received signal, and a computer, which is connected to the terminal, for monitoring an operation state of the terminal while receiving the signal from the base station, and performing an error check to determine if an error exists in the signal received in the terminal.

According to another aspect of the present, there is provided a method for verifying diversity of a base station in a mobile communication system, the mobile communication system including the base station for outputting at least one antenna signal using a space-time transmit diversity, attenuators for attenuating each of the at least one antenna signal according to reception sensitivity of a terminal and outputting the attenuated at least one antenna signal, the terminal for receiving the attenuated antenna signals, and a computer for performing an error check for the signals received in the terminal, the method includes the steps of: determining degrees of attenuation of attenuators according to a reception sensitivity level of the terminal and an output level of the base station when the reception sensitivity level of the terminal is determined by a noise figure according to a frequency band and a modulation method of the base station; attenuating the antenna signals by means of the determined degree of attenuation when at least one or more antenna signals are received from the base station; receiving the attenuated antenna signals and demodulating the received signals; and an operation state of the terminal, which demodulates the received signals, and performing an error check to determine if an error exists in the signal received in the terminal.

BRIEF DESCRIPTION OF THE DRAWINGS

The above and other objects, features, and advantages of the present invention will be more apparent from the following detailed description taken in conjunction with the accompanying drawings, in which:

FIG. 3 is a table illustrating a minimum input level reception sensitivity of a receiver provided in an IEEE 802.16a standard proposal; and FIG. 4 is a table illustrating a result of a verification for diversity performance of a base station according to an embodiment of the present invention.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may obscure the subject matter of the present invention.

Additionally, in order to exactly verify diversity performance of a base station according to the present invention, it is preferable to measure the diversity performance of the base station in an actual radio network. However, as is will be described herein below, an embodiment of the present invention realizes an apparatus for verifying diversity performance of a base station, which is under environments similar to those in an actual radio network, thereby obtaining a result similar to a result of verification for diversity of a base station in an actual radio network.

Figure 1:
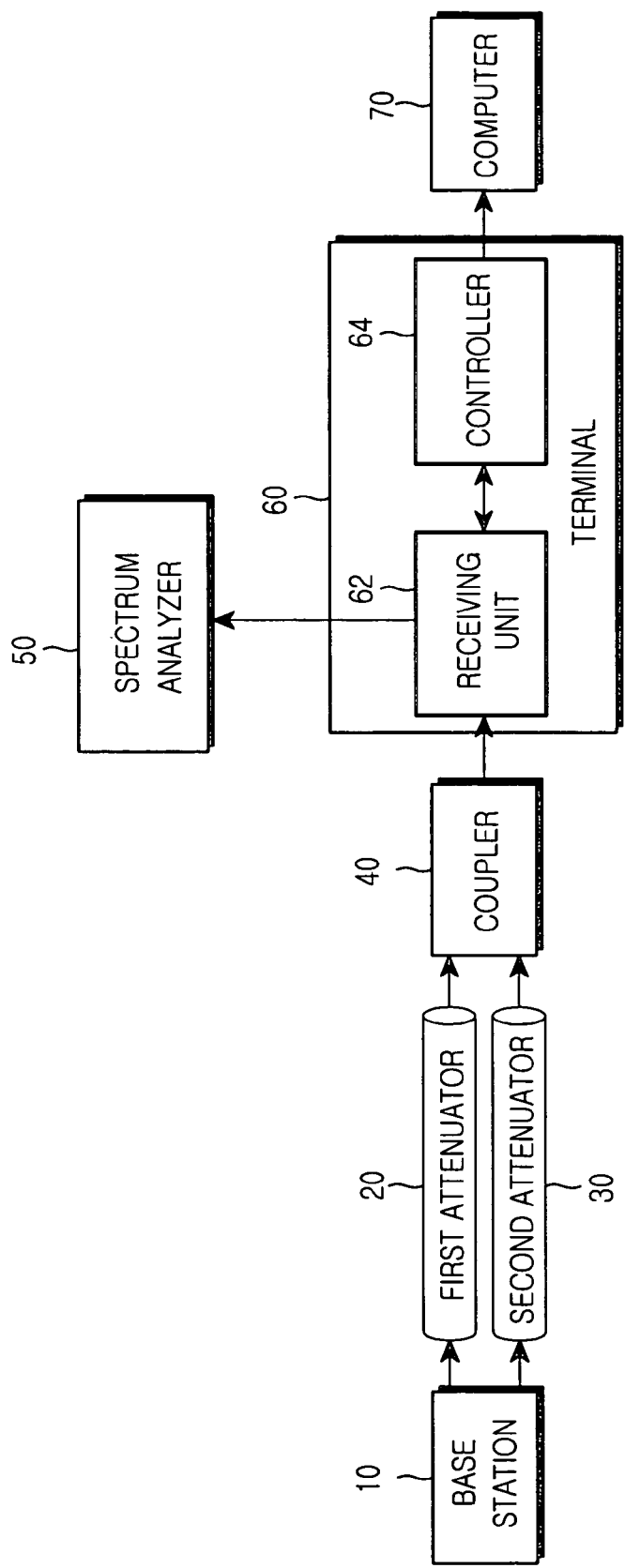
FIG. 1 is a block diagram illustrating an apparatus for verifying diversity of a base station according to an embodiment of the present invention.

FIG. 1 is a block diagram illustrating an apparatus for verifying diversity of a base station according to an embodiment of the present invention. Referring to FIG. 1, the apparatus for verifying the diversity of the base station according to the present invention verifies a space-time coding used in the base station by utilizing an OFDM method and the apparatus includes a base station 10, a first attenuator 20, a second attenuator 30, a coupler 40, a spectrum analyzer 50, a terminal 60, and a computer 70. The base station 10 performs the same functions as those of a conventional base station using an OFDM method, which includes two antennas, uses a space-time coding, and transmits a radio signal through the two antennas. The base station 10 is connected to the first attenuator 20 and the second attenuator 30. Further, the base station 10 outputs a first antenna signal and a second antenna signal using the space-time coding according to the present invention.

According to an embodiment of the present invention, because the base station 10 cannot output high power of more than 25 W, like a conventional base station, it is preferable that an output power level has a value of −70 dBm. Accordingly, it is preferable that the first antenna signal and the second antenna signal output from the base station 10 are output with power of −70 dBm.

The first attenuator 20 attenuates the first antenna signal output from the base station 10 and the second attenuator 30 attenuates the second antenna signal output from the base station 10. That is, the first attenuator 20 attenuates the first antenna signal, which is output from the base station 10, according to the reception sensitivity of the terminal 60, and sends the attenuated signal to the coupler 40. The second attenuator 30 attenuates the second antenna signal, which is output from the base station 10, according to the reception sensitivity of the terminal 60, and sends the attenuated signal to the coupler 40. The coupler 40 couples the attenuated signals with each other and thus, outputs a single signal.

The terminal 60 exchanges data and voice signal with a base station wirelessly in a mobile communication system, and includes a receiving unit 62 and a controller 64. The receiving unit 62 may be constructed by an RF circuit and receives the signal output from the coupler 40 in order to send the received signal to the spectrum analyzer 50 and the controller 64 under a predetermined control of the controller 64. The controller 64 performs an auto gain control (AGC) and an auto frequency control (AFC), and controls the receiving unit 62 according to the state of the base station 10.

The spectrum analyzer 50 is a general measuring unit that receives a modulated wave, analyzes a sideband, and displays the distribution of a frequency spectrum component. In present invention, the spectrum analyzer 50 measures and displays a voltage controlled oscillator (VCO) frequency of the receiving unit 62 in the terminal 60. The VCO frequency of the receiving unit 62 displayed on the spectrum analyzer 50 enables a user to check a synchronization state of the terminal 60.

The computer 70, which is connected to the controller 64, monitors an operation state of the terminal 60 while receiving the signal from the base station 10, and performs a cyclic redundancy checking (CRC) in order to determine if an error exists in the signal received the receiving unit 62 through the controller 64.

In the apparatus for verifying the diversity of the base station as described above, when a frequency band and a modulation method are determined, a noise figure is determined according to the determined frequency band and modulation method. A reception sensitivity level of the terminal 60 is determined according to the noise figure. When the reception sensitivity level of the terminal 60 is determined, the degree of attenuation of the first attenuator 20 and the second attenuator 30 is determined according to the output level of the base station 10. Accordingly, the output level of the base station 10 and the degree of attenuation of the first attenuator 20 and the second attenuator 30 are adjusted, such that virtual radio channel environments can be constructed.

Figure 2:
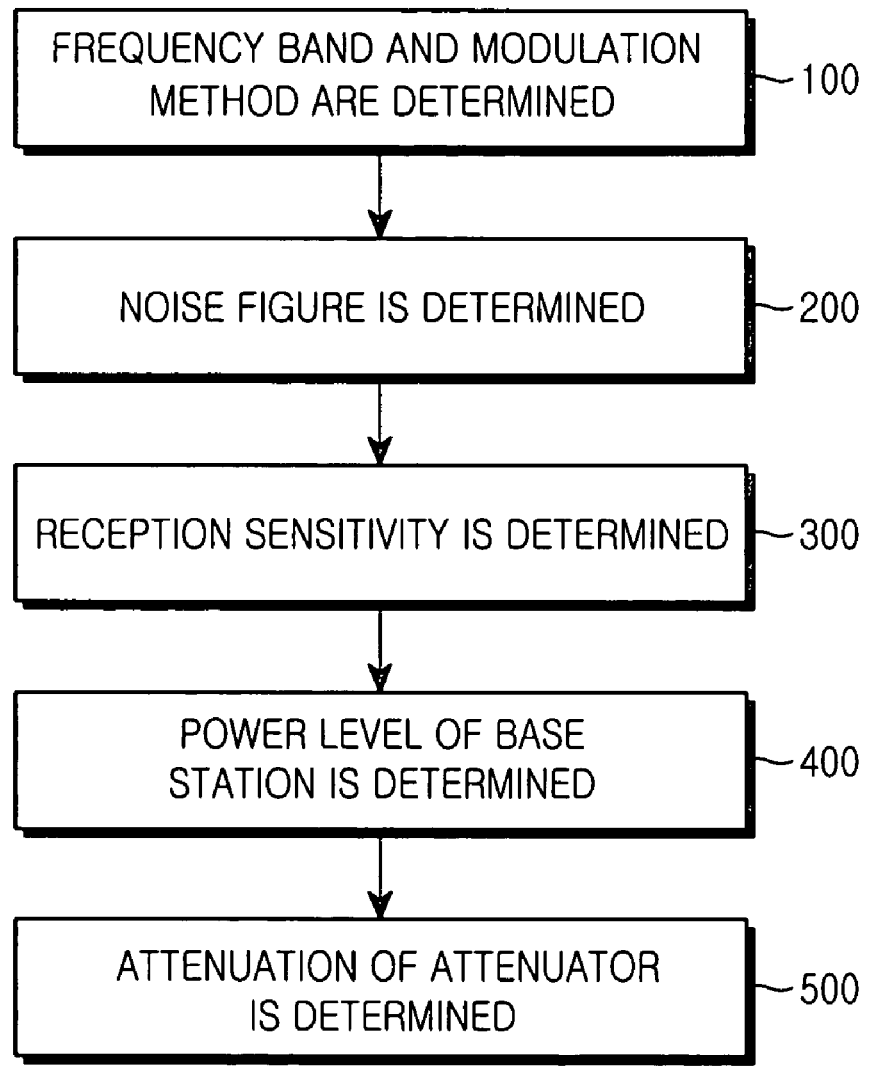
FIG. 2 is a flowchart illustrating a method for verifying diversity performance of a base station according to an embodiment of the present invention.

FIG. 2 is a flowchart illustrating a method for verifying diversity performance of a base station according to an embodiment of the present invention, FIG. 3 is a table illustrating a minimum input level reception sensitivity of a terminal provided in an IEEE 802.16a standard proposal, and FIG. 4 is a table illustrating a result of verification for diversity performance of a base station according to an embodiment of the present invention. Hereinafter, a space-time coding verification process by the apparatus for verifying the diversity of the base station using an OFDM method according to the present invention will be described in detail with reference to FIGS. 1 to 4.

When it is assumed that the base station 10 uses a frequency band of 10 MHz and a QPSK ½ modulation method in step 100 of FIG. 2, the minimum input level reception sensitivity of the terminal 60 becomes −83 dBm as provided in the IEEE 802.16a standard proposal illustrated in FIG. 3.

As described above, when the minimum input level reception sensitivity of the terminal 60 is determined according to the frequency band and the modulation method, a noise figure can be determined using the frequency band and the minimum input level reception sensitivity of the terminal 60 in step 200. That is, when the frequency band is 10 MHz and the minimum input level reception sensitivity is −83 dBm, thermal noise and a noise figure can be calculated by Equations (1) and (2) below.

$$\text{thermal noise} = kTB \text{ (k: boltzmann constant, } T: \text{ absolute temperature, } B: \text{ bandwidth)} = \{1.37 \times 10^{\wedge}(-23)\} \times (300) \times \{10 \times (10^{\wedge}6)\} = -104 \text{ dBm} \quad \text{Equation (1)}$$

$$\text{noise figure} = \text{signal to noise ratio of an input signal/signal to noise ratio of an output signal} = \{-83 \text{ dBm} - (-104 \text{ dBm}) = 21 \text{ dB}\} - \{9.4 \text{ dB}\} = 21 \text{ dB} - 9.4 \text{dB} = 11.6 \text{dB} \quad \text{Equation (2)}$$

Herein, when the frequency band is 10 MHz and the reception sensitivity is −83 dBm, the noise figure provided in the IEEE 802.16a standard proposal is 7 dB. This value has a noise margin of 4.6 dB (=11.6 dB-7 dB) in comparison with the calculated actual noise figure. Accordingly, in step 300, when the frequency band and the modulation method used in the base station 10 are respectively 10 MHz and a QPSK ½, the minimum input level reception sensitivity of the terminal 60 is determined to have a value of −87.6 dB, i.e., a value reduced by 4.6 dB.

In step 400, the first antenna signal and the second antenna signal output from the base station 10 are determined to have a value of −70 dBm. Because the base station 10 cannot output a high power of more than 25 W, like conventional base station, the output power level of the base station 10 is determined to be of about −70 dBm.

When the output power level of the base station 10 is determined to be −70 dBm, because the minimum input level reception sensitivity of the terminal 60 has a value of −87.6 dB, the first attenuator 20, the second attenuator 30, and the coupler 40 must have a loss of −17.6 dB {=(−87.6-(−70))}. Accordingly, the first attenuator 20 and the second attenuator 30 maintain their degree of attenuation at a value of −20 dB, because the first antenna signal and the second antenna signal are coupled with each other in the coupler 40, thereby increasing the power by 3 dB. That is, because the first attenuator 20, the second attenuator 30, and the coupler 40 have a loss of −17 dB (=−20 dB+3 dB), it is possible that the first attenuator 20, the second attenuator 30, and the coupler 40 have a loss similar to the loss (e.g., −17.6 dB) in virtual radio environments.

While experiencing the processes as described above, virtual radio environments for verifying the space-time coding of the base station 10 are determined. The virtual radio environments are environments in which it is assumed that the minimum reception sensitivity of the terminal 60 has a value of −83 dB. Further, the power level of the base station 10 and the input level reception sensitivity of the terminal 60 may be changed by repeating the processes as described above.

In the radio environments determined as described above, when the space-time coding has not been applied to the base station 10, it is assumed that the first antenna signal is an antenna signal output from the base station 10. However, when the space-time coding has been applied to the base station 10, it is assumed that the second antenna signal is an antenna signal additionally output from the base station 10 together with the first antenna signal.

Accordingly, in order to illustrate a case in which the space-time coding has not been applied to the base station 10, the first attenuator 20 outputs the first antenna signal intact without attenuating the first antenna signal. Further, the second attenuator 30 sufficiently attenuates the second antenna signal by the calculated size of the thermal noise and causes the second antenna signal not to be output. For example, when the second antenna signal output from the base station 10 is −70 dBm, the second attenuator 30 attenuates the second antenna signal by −30 dB {=−104 dB-(−70 dB)} and causes the second antenna signal not to be output.

However, in order to illustrate a case in which the space-time coding has been applied to the base station 10, the first attenuator 20 and the second attenuator 30 output the first antenna signal and the second antenna signal intact without attenuating both the first antenna signal and the second antenna signal.

According to an embodiment of the present invention, in a case in which a space-time coding setting has been made, when receiving the first antenna signal and the second antenna signal, the terminal 60 can demodulate the received first antenna signal and second antenna signal. However, in a case in which a space-time coding setting has not been made, the terminal 60 can demodulate only the first antenna signal from among the received first antenna signal and second antenna signal.

FIG. 4 is a table illustrating a verification result for diversity performance of a base station according to an embodiment of the present invention. More specifically, FIG. 4 illustrates an error state according to either an existence or absence of a space-time coding operation in the terminal 60, when both the first antenna signal and the second antenna signal are input to the terminal 60, or either the first antenna signal or the second antenna signal is input to the terminal 60, through the adjustment of attenuation by the first attenuator 20 and the second attenuator 30.

Referring to FIG. 4, a first attenuation represents the degree of attenuation of the first attenuator 20 and a second attenuation represents the degree of attenuation of the second attenuator 30. An existence or absence of a space-time coding setting in the terminal 60 represents whether or not a space-time coding demodulation function is set in the terminal 60. When the space-time coding has been set in the terminal 60, the terminal 60 can demodulate both the first antenna signal and second antenna signal. However, when the space-time coding has not been set in the terminal 60, the terminal 60 can demodulate only the first antenna signal.

The error state of FIG. 4 illustrates a result of a cyclic redundancy checking error check for representing whether or not a corresponding signal has been normally demodulated when the first antenna signal and second antenna signal have been input to the terminal 60. For example, a first case in which the first attenuation has a value of −20 dB and the second attenuation has a value of −20 dB represents a case in which the space-time coding has been applied to the base station 10. That is, this case represents a state in which both the first antenna signal and the second antenna signal are input to the terminal 60. When the space-time coding has been set in the terminal 60, because the terminal 60 can demodulate both the first antenna signal and the second antenna signal, a demodulation error state when the cyclic redundancy checking error check has been performed must be in a "GOOD" state, that is, a state in which no error exists.

A second case in which the first attenuation has a value of −20 dB and the second attenuation has a value of −40 dB represents a case in which the space-time coding has not been applied to the base station 10. That is, this case represents a state in which only the first antenna signal is input to the terminal 60. When the space-time coding has been set in the terminal 60, because the terminal 60 can demodulate the input first antenna signal, a demodulation error state when the cyclic redundancy checking error check has been performed must be in a "GOOD" state, that is, a state in which no error exists.

A third case in which the first attenuation has a value of −40 dB and the second attenuation has a value of −20 dB represents a case in which the space-time coding has been applied to the base station 10. That is, this case represents a state in which only the second antenna signal is input to the terminal 60. When the space-time coding has been set in the terminal 60, because the terminal 60 can demodulate the input second antenna signal, a demodulation error state when the cyclic redundancy checking error check has been performed must be in a "GOOD" state, that is, a state in which no error exists.

A fourth case in which the first attenuation has a value of −20 dB and the second attenuation has a value of −20 dB represents a case in which the space-time coding has been applied to the base station 10. That is, this case represents a state in which both the first antenna signal and the second antenna signal are input to the terminal 60. When the space-time coding demodulation function has not been set in the terminal 60, because the terminal 60 cannot demodulate both the first antenna signal and the second antenna signal, a demodulation error state when the cyclic redundancy checking error check has been performed must be in a "BAD" state, that is, a state in which an error has occurred.

A fifth case in which the first attenuation has a value of −20 dB and the second attenuation has a value of −40 dB represents a case in which the space-time coding has not been applied to the base station 10. That is, this case represents a state in which the first antenna signal is input to the terminal 60. Even when the space-time coding has not been set in the terminal 60, because the terminal 60 can demodulate the input first antenna signal, a demodulation error state when the cyclic redundancy checking error check has been performed must be in a "GOOD" state, that is, a state in which no error exists.

A sixth case in which the first attenuation has a value of −40 dB and the second attenuation has a value of −20 dB represents a case in which the space-time coding has been applied to the base station 10. That is, this case represents a state in which only the second antenna signal is input to the terminal 60. When the space-time coding has not been set in the terminal 60, because the terminal 60 cannot demodulate the input second antenna signal, a demodulation error state when the cyclic redundancy checking error check has been performed must be in a "BAD" state, that is, a state in which an error has occurred.

When both the first antenna signal and the second antenna signal are input to the terminal 60, or either the first antenna signal or the second antenna signal is input to the terminal 60, when an error state is shown as described above, it is verified that a space-time coding of a corresponding base station is in a state in which there is no problem.

As described above, in an apparatus for verifying diversity of a base station according to the present invention, when a frequency band and a modulation method of the base station are determined, a noise figure is determined according to the determined frequency band and modulation method, and the reception sensitivity level of a terminal is determined according to the noise figure. Further, when the reception sensitivity level of the terminal is determined, the degree of attenuation of a first attenuator and a second attenuator is determined according to the output level of the base station, such that conditions similar to actual radio environments can be formed. Therefore, a space-time coding method used in the base station can be verified.

In addition, the present invention enables the space-time coding of the base station to be verified at a development step, such that development cost and time of the base station can be reduced. Therefore, cost reduction after the installation of the base station can be anticipated.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for verifying a space-time coding application to a base station in a mobile communication system, the apparatus comprising:
    a base station having two antennas for outputting an antenna signal from one predetermined antenna of the two antennas in a case where the space-time coding has not been applied to the base station, and outputting antenna signals from both antennas in a case where the space-time coding has been applied to the base station;
    a plurality of attenuators for attenuating the antenna signals output from the two antennas of the base station, respectively, and combining the attenuated signals from the two antennas with each other;
    a coupler for coupling the combined signals from the antennas output from the attenuators with each other and outputting the coupled signal;
    a terminal for receiving a signal coupled by the coupler and demodulating the received signal, wherein the antenna signal output from both antennas is demodulated when the space-time coding has been set in the terminal, and the antenna signal output from the predetermined one antenna of the antennas is demodulated when the space-time coding has not been set in the terminal; and
    a computer for performing an error check on the demodulated result and verifying the space-time coding of a signal for the base station according to the error check result.

2. The apparatus of claim 1, wherein the combined signals comprise:
    a first combined signal comprised of only an output of a first antenna of the two antennas;
    a second combined signal comprised of only an output of a second antenna of the two antennas; and
    a third combined signal comprised of both of the output of the two antennas.

3. The apparatus of claim 2, wherein the computer verifies whether the space-time coding has been applied to the signal output from the base station by determining that there are no errors in the first, second and third combined signals as the space-time coding application.

4. The apparatus of claim 3, wherein if the first antenna is operated as an antenna for outputting a signal in a case in which the space-time coding has not been applied to the base station, no error exists in only the first combined signal.

5. A method for verifying a space-time coding application to a base station in a mobile communication system, the method comprising the steps of:
    outputting at least one antenna signal of two antennas according to the existence or absence of a space-time coding application through the base station;
    attenuating the antenna signals output from the two antennas of the base station, respectively, and combining the signals from the two antennas with each other;
    coupling the signals combined from the two antennas into a coupled signal;
    demodulating the coupled signal by a terminal according to the existence or absence of the space-time coding setting; and
    performing an error check on the demodulated result and verifying the space-time coding of a signal for the base station according to the error check result; and
    monitoring an operation state of the terminal, performing an error check to determine if an error for the signal combined from two antennas exists in the coupled signal received in the terminal, and verifying whether the space-time coding has been applied to the signal output from the base station.

6. The method of claim 5, wherein the combined signals comprise:
    a first combined signal comprised of only an output of a first antenna of the two antennas;
    a second combined signal comprised of only an output of a second antenna of the two antennas; and
    a third combined signal comprised of both of the output of the two antennas.

7. The method of claim 6, wherein a computer verifies whether the space-time coding has been applied to the signal output from the base station by determining that there are no errors in the first, second and third combined signals as the space-time coding application.

8. The method of claim 7, wherein if the first antenna is operated as an antenna for outputting a signal when the space-time coding has not been applied to the base station, no error exists in only the first combined signal.

* * * * *